United States Patent [19]
Rudnitzky

[11] 3,994,465
[45] Nov. 30, 1976

[54] BEVERAGE HOLDER

[76] Inventor: Karl W. Rudnitzky, Rte. 113 and Telegraph Road, R.R. No. 1, Box 337, Perkasie, Pa. 18944

[22] Filed: July 15, 1975

[21] Appl. No.: 596,057

[52] U.S. Cl. .............................. 248/311.1; 211/88
[51] Int. Cl.² ..................... A47B 73/00; B60N 3/10; A47C 7/70
[58] Field of Search ................... 248/311, 309, 293; 211/88, 99; 108/6, 26

[56] References Cited
UNITED STATES PATENTS

| | | | |
|---|---|---|---|
| 2,576,560 | 11/1951 | Bidmon | 248/309 UX |
| 2,965,890 | 12/1960 | Robillard | 248/311 R X |
| 3,113,531 | 12/1963 | Barnard | 248/293 X |
| 3,844,444 | 10/1974 | Carroll | 248/311 R X |

FOREIGN PATENTS OR APPLICATIONS

| | | | |
|---|---|---|---|
| 718,270 | 1/1932 | France | 248/293 |
| 883,598 | 11/1961 | United Kingdom | 248/311 R |

*Primary Examiner*—J. Franklin Foss
*Attorney, Agent, or Firm*—Joseph W. Molasky

[57] ABSTRACT

A collapsible beverage holder which can be maintained in a receiving position when in use and which can be folded down when not in use.

The beverage holder is maintained in its receiving position by a pivot means and by an aperture in an accommodating support member. By sliding the support member down over said pivot means, the receiving member is locked in place.

Conversely, the said receiving member can be disengaged and folded down by sliding the support member up on said pivot and permitting it to rotate down until it comes to rest.

The instant device can be secured to any vertical surface by suitable means.

10 Claims, 8 Drawing Figures

U.S. Patent  Nov. 30, 1976  Sheet 1 of 2  3,994,465
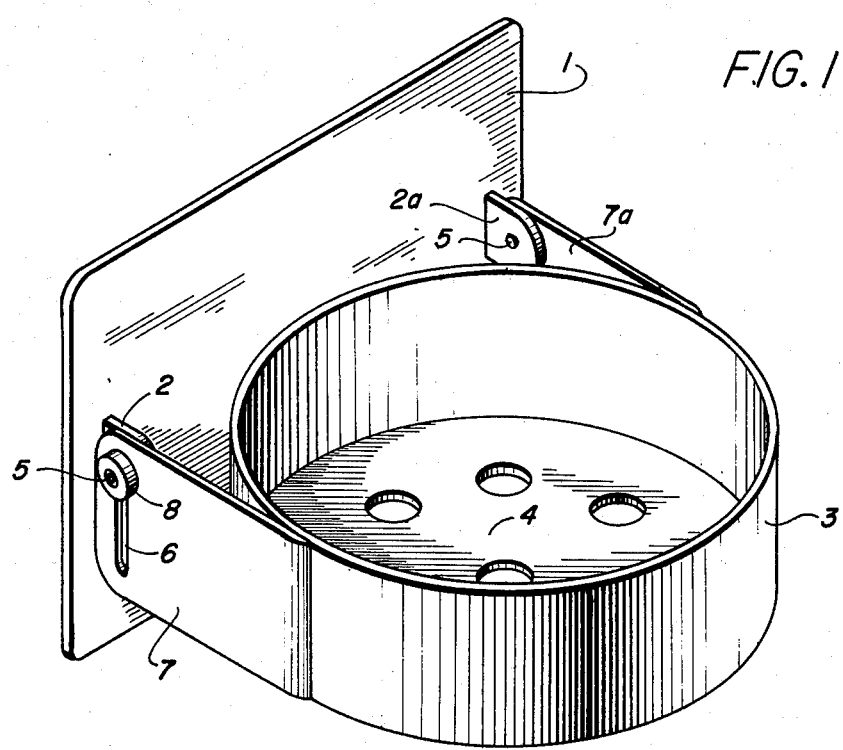
FIG. 1
FIG. 3
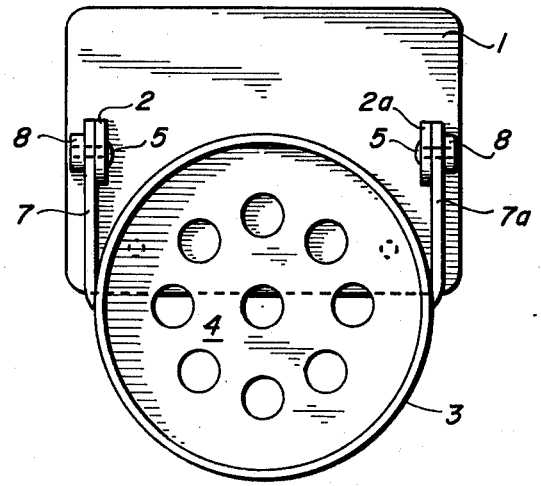
FIG. 2
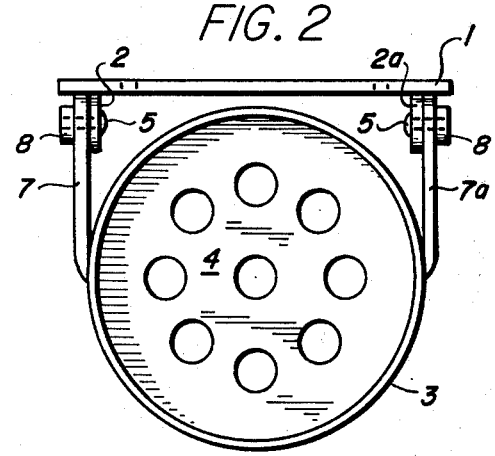
FIG. 5
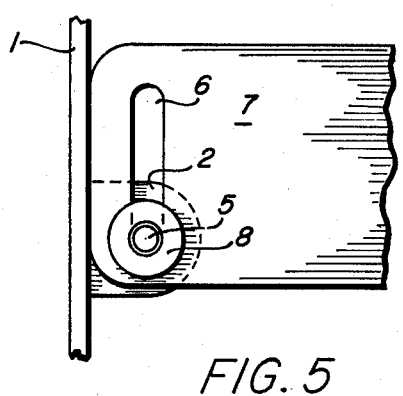
FIG. 4
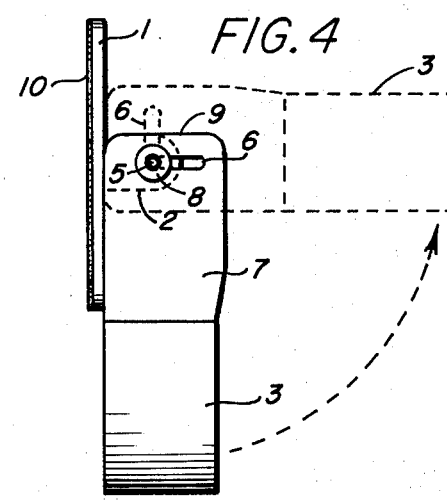

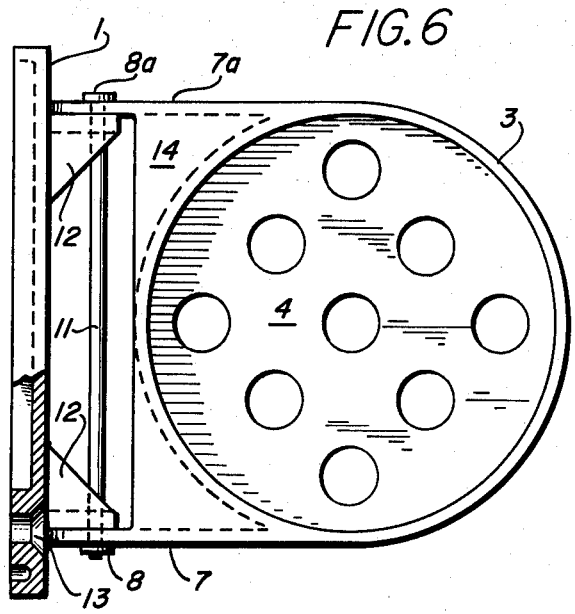
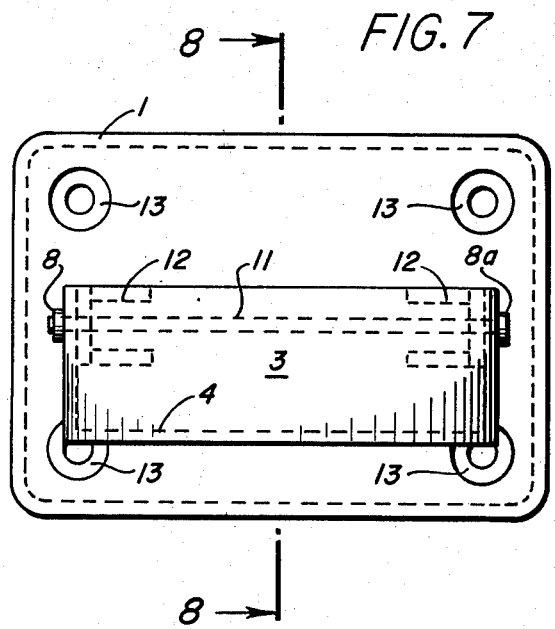
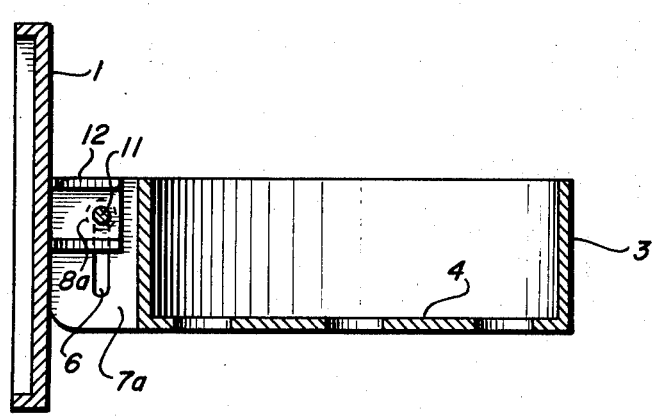

BEVERAGE HOLDER

This invention relates to a new device which has utility as a beverage holder.

Specifically, this invention relates to a novel apparatus which, in addition to serving as a beverage holder, can be folded down to an unobtrusive and compact size when it is no longer needed.

This device is also characterized by a locking and unlocking means which is unique among beverage holders and which, because of its construction, is capable of holding beverages of a significantly greater weight and in a more secure manner than was heretofore possible.

A further characteristic of the instant device is its simplicity and the economies resulting from its modest construction and only two moving parts.

Furthermore, the adaptability of this device and its potentialities for use are unlimited; thus, it can be used both indoors and outdoors and in moving vehicles and its mode of action is so facile that it can be operated by children and adults alike.

Still another feature of this device is the relative ease with which it can be secured to any vertical surface, thus making it a suitable accoutrement for use in the home, office or shop and the like, or on a boat, auto, plane or any environ having a relatively flat and vertical surface.

Further aspects of this invention will be apparent from the disclosure which follows.

BACKGROUND OF THE INVENTION

Collapsable beverage holders of various types are well known in the art.

One such device is covered by U.S. Pat. No. 2,904,299 issued to Herman L. Dalton. That invention consists of an article holder which is secured to an automobile panel via a clip-means and the holder per se is engaged for use and disengaged for non-use by means of a ball and detent trunnion. This device requires the tightening of a set screw and the engagement of locking balls in accommodating recesses to assure an horizontal support which will sustain the weight of the article to be placed therein. Even in its disengaged or stored position this device is bulky.

By contrast, in the instant device, there is no need to maintain the holder in position by means of a set screw or locking balls. This invention is characterized by a minimum of only two moving parts and, when not in use, it can be ingeniously stored by simply pivoting the beverage holder on its pin so that it lies flat against the accomodating wall-plate.

A second type of beverage holder is described in U.S. Pat. No. 1,079,192 issued to Charles N. Sowden. This device provides a collapsable support for a thermos bottle and utilizes a pivot pin means to secure the retainer or holder to a wall-plate; however, it suffers from several drawbacks. Firstly, the device requires both a holder on which the thermos bottle can be rested and a retaining ring located above the holder for the purpose of steadying and maintaining the thermos bottle in position on said holder. In addition, this device requires the use of springs which resist the horizontal movement of the said holder and said retaining ring. As a result, the removal of the thermos bottle from the seat or holder results in an automatic upward movement of the holder so that it lies flat against the face of the plate. In other words, the holder cannot be locked or maintained in a receiving or holding position. Also, in this device, the seat or holder has a very modest rim which can hardly serve as an effective means for holding the thermos bottle in place; therefore, the retaining ring is needed to provide the steadying support for the said bottle.

By contrast to the foregoing, applicant's invention consists of a holder which requires no retaining ring and no springs. It is capable of maintaining the beverage container in an upright position solely by means of the cylindrical wall which envelops a portion of said container.

Most importantly, the instant device is maintained in position by a pivot-and-lock means which is not described in the prior art. The instant holder is maintained in a receiving position and in a non-use position solely by virtue of a pivot means and an aperture in the holder-support which slides down over said pivot. This mode of operation will be described more thoroughly in the description which follows.

THE DRAWINGS

FIG. 1 is a front view of a device according to this invention.

FIG. 2 is a top view of the device of FIG. 1;

FIG. 3 is a front view of the device of FIG. 1 in its folded down position;

FIG. 4 is a side view of the device of FIG. 3;

FIG. 5 is an enlarged and sectional side view of the device of FIG. 1;

FIG. 6 is a top view of a second embodiment of the device of this invention;

FIG. 7 is a frontside view of the device of FIG. 6; and

FIG. 8 is a cross-sectional view of the device of FIG. 7 along lines 8—8.

THE INVENTION

Considered in its broadest aspects, this invention consists essentially of the following elements:
 a. a cylindrical container with support members adjoined to opposite sides of said container;
 b. a wall-plate for securing said container to a vertical surface; and
 c. a pivot-and-lock means for securing said container to said wall-plate so that the container can be locked into a horizontal position to receive a beverage when it is put in use, or folded down for compactness when it is not in use.

More specifically, the device of this invention comprises:
 a. a cylindrical container with support members adjoined to opposite sides of said container; each support member being characterized by the presence of a longitudinal aperture located along their terminal edges and journalled to accept the pivot pin which exits from said extension members;
 b. a wall-plate containing two perforated extension members adfixed at right angles to its front side; and
 c. a locking disc which accepts the pivot pin exiting from the aperture of said support members and which prevents it from leaving said aperture.

This invention shall now be described with reference to the several Figures but specifically FIG. 1.

The instant device (FIG. 1) is comprised of a wall-plate 1 which can be secured to any vertical surface by means of adhesive or the like. Adjoined to the front side of this wall-plate, at a right angle, are two flat extension members 2 and 2a spaced apart from each other at approximately the width of container 3.

The container 3 is a cylinder with walls of such height as to provide a support for the beverage article to be placed therein. Typical of such articles are cans, bottles, tumblers or thermos containers and the like. The base of the cylinder is a continuous flat surface; however, when used outdoors, I prefer to employ a perforated base 4, i.e., one containing several spaced openings so that any beverage which spills onto the base can drain off through said openings.

Another aspect of this invention consists of securing a suctorial device to the base 4 so that upon placing the beverage article into the cylinder it will be gripped by suction and there remain in an upright position insured against accidental spills until it is released by the intended user.

The container 3 is joined to the wall-plate by a transverse pin 5 which passes through the extension members 2 and 2a and the accommodating aperture 6 of supports 7 and 7a.

The means by which container 3 is maintained in its horizontal position when it is in use, or folded down, when not in use, goes to the essence of this invention and I hereinafter refer to this operation as a pivot-and-lock means.

Simply stated, this pivot-and-lock means relies upon the interaction of several elements which have been combined in a unique manner to provide a secure beverage holder and which, when no longer needed, can be folded down for compactness and convenience.

In practice, the container 3 is placed into a receiving or operable mode by pivoting the said container on pin 5 (FIG. 4) so that the container lies at a right angle with respect to wall-plate 1. At this point in the operation, pin 5 is at the bottom of aperture 6 (FIG. 5) and the backsides 9 of members 7 and 7a have come into contact with the face of wall-plate 1. Thereafter, the container is locked into place by allowing it to slidingly descend, while still in a horizontal position, over pin 5 through aperture 6 until its descent is arrested by the contact of pin 5 with the top of aperture 6.

At this juncture, the container is supported via extension member 2 and 2a at two points: vertically as a result of the combined contact of pin 5 with the top of aperture 6 and laterally, via the compaction of wall-plate 1 against the backside 9 of support members 7 and 7a.

The transverse pin 5 is maintained in place in aperture 6 by a journalled locking disc 8. In addition to preventing said pin from leaving aperture 6 the locking disc 8 also serves as a slideable guide for the pivot-and-lock operation described in the preceding paragraphs.

The foregoing description sets forth the steps by which the instant device can be placed into an operable position for use as a beverage-holder. To fold-down the container element 3 when it is no longer needed, it is only necessary to reverse the above procedure.

This fold-down operation is effected by simply raising the container element 3 straight up while it is still in a horizontal position with respect to wall-plate 1. In this raised position, the transverse pin 5 is at the very bottom of aperture 6 (FIG. 5) and the backsides 9 of supports 7 and 7a remain flush against the wall-plate 1. At this juncture, the container element 3 is pivoted down 180° until its underside comes to rest against the said wall-plate. The device is now unobtrusively folded up and safely compacted to await its next use.

The beverage-holding device of this invention may be modified in several respects from that shown in FIG. 1 without departing from the spirit of this invention. Several such modifications are shown in FIGS. 6–8.

In one variation, additional support is provided for container 3 by adding a web 14 to join the support members 7 and 7a to the periphery of the cylinder. In practice, I have found it desirable to provide for this feature by molding the cylindrical container 3 to include support members 7 and 7a and web 14 as a single unit.

Similar support is provided for extension members 2 and 2a in FIG. 1 by the addition of webbed supports 12. These supports are bonded to the face of wall-plate 1 and to support members 7 and 7a by conventional means. Ideally, they are comprised of the same material as is utilized in molding container 3.

Also, the pins 5 in FIG. 1 can be replaced by a single pin 11 (FIG. 6) so that the latter spans the entire distance from support 7 to support 7a. The pin utilized in this construction can be comprised of the same material as container 3 and, in practice, can be molded to include a head 8a which will serve as the locking disc on the side of support 7a.

FIG. 7 is a frontside view of the device of FIG. 6 and illustrates the position of four holes 13 which can be used to secure the wall-plate to a vertical surface via the use of screws or nails and the like. FIG. 8 is a cross-sectional view of the device of FIG. 7 along lines 8—8.

It will be apparent to those skilled in the art that the instant device can be constructed of any suitable material such as metal or plastic but, preferably, for economy, I prefer to employ a translucent plastic material.

Likewise, the size of the instant device is not critical and it can be varied to meet the needs of the designer. It is a unique feature of this invention that the instant device is characterized by its ability to support objects of relatively great weight; therefore, this device may be constructed of any size to serve as a holding apparatus for articles of variable weights such as cans of soda, soft drink bottles, tumblers or larger size articles such as thermos containers or quart-size bottles and the like.

Although nails and screws are eminently suitable for adfixing the instant device to a vertical surface, nevertheless, I have found that the use of several adhesive strips secured to the back of the instant wall-plate will serve to maintain the device in position safely when the objects placed in the container are of the conventional beverage size such as 12 or 16 ounce beverage containers.

It should be understood that my concept is not limited by the foregoing description. Instead, it is capable of wide variation and modification and to the extent that any such modification is obvious, I expressly include it as being within the scope of this invention.

Having thus described my concept and its preferred embodiments, I present the following claims.

What is claimed is:

1. A beverage-holding device consisting essentially of:
   a. a cylindrical container with support members adjoined to opposite sides of said container;
   b. a wall-plate for securing said container to a vertical surface; and
   c. a pivot-and-lock means for securing said container to said wall-plate so that the container can be pivoted and slidably locked into a horizontal position to receive a beverage when it is put in use, or slidably disengaged and pivoted down for compactness when it is not in use; said pivot-and-lock means including abutment surfaces on the end of said support members adjacent to said wall-plate, and slots in said support members spaced outwardly from and parallel to said abutment surfaces.

2. The device of claim 1 wherein:
a. the support members adjoined to the container are characterized by the presence of a longitudinal aperture located along their terminal edges and journalled to accept the pivot pin which exits from said extension members;
b. the wall-plate contains two perforated extension members affixed to its front side; and
c. the locking disc accepts the pivot pin exiting from the apertures of said support members and prevents it from leaving said apertures.

3. The device of claim 2 wherein the pivot means consists of two separate pivot pins.

4. The device of claim 2 wherein the pivot means consists of a single pivot pin.

5. The device of claim 1 wherein the base of the cylindrical container is perforated to allow liquid to pass therethrough.

6. The device of claim 1 wherein a suction means is adjoined to the base of the cylindrical container to provide a holding means for the beverage placed therein.

7. The device of claim 1 wherein the back-side of the wall-plate is treated with an adhesive for the purpose of securing same to a vertical surface.

8. The device of claim 1 wherein the wall-plate is secured to the vertical surface by screws or nails.

9. The device of claim 1 constructed of plastic.

10. The device of claim 2 wherein the support members and the cylindrical container are joined by a web and constitute a single unit.

* * * * *